United States Patent [19]
Ichinose

[11] Patent Number: 5,870,986
[45] Date of Patent: Feb. 16, 1999

[54] FUEL INJECTION CONTROLLING APPARATUS IN STARTING AN INTERNAL COMBUSTION ENGINE

[75] Inventor: Hiroki Ichinose, Fujinomiya, Japan

[73] Assignee: Toyota Jidosha Kabushiki Kaisha, Toyota, Japan

[21] Appl. No.: 80,159

[22] Filed: May 15, 1998

[30] Foreign Application Priority Data

May 19, 1997 [JP] Japan ................................. 9-129036

[51] Int. Cl.⁶ ............................................. F02D 41/06
[52] U.S. Cl. ................................. 123/179.16; 123/491
[58] Field of Search .................... 123/179.16, 491

[56] References Cited

U.S. PATENT DOCUMENTS

| | | | |
|---|---|---|---|
| 3,734,067 | 5/1973 | Glockeer et al. | 123/491 |
| 4,250,849 | 2/1981 | Takase | 123/491 |
| 4,266,521 | 5/1981 | Nakano et al. | 123/491 |
| 4,562,817 | 1/1986 | Ito | 123/491 |
| 4,628,886 | 12/1986 | Onishi | 123/179.16 |
| 4,932,379 | 6/1990 | Tang et al. | 123/491 |
| 5,390,641 | 2/1995 | Yamada et al. | 123/491 |
| 5,482,023 | 1/1996 | Hunt et al. | 123/491 |
| 5,542,393 | 8/1996 | Katoh et al. | 123/491 |
| 5,577,482 | 11/1996 | Nakashima et al. | 123/179.16 |
| 5,590,633 | 1/1997 | Tomisawa et al. | 123/491 |
| 5,595,161 | 1/1997 | Ott et al. | 123/491 |
| 5,690,075 | 11/1997 | Tanata et al. | 123/491 |
| 5,758,625 | 6/1998 | Ponti | 123/491 |

FOREIGN PATENT DOCUMENTS 62-210230A 9/1987 Japan.
2 5018B2 10/1990 Japan.

*Primary Examiner*—Erick R. Solis
*Attorney, Agent, or Firm*—Kenyon & Kenyon

[57] ABSTRACT

An object of the present invention is to provide an intake synchronous injection type fuel injection controlling apparatus in synchronism with an intake stroke in starting an internal combustion engine, which may positively feed necessary fuel for each cylinder and improve startability and emission. Then, according to the present invention, in order to attain this object, there are provided with an injection number counter means for counting a total sum obtained by summing fuel injection numbers of all the cylinders from the start of the internal combustion engine, and a fuel injection timing changing means for advancing a fuel injection start timing by a predetermined period when the fuel injection number counted by this injection number counter means is equal to or more than a predetermined number.

5 Claims, 7 Drawing Sheets

FUEL INJECTION CONTROLLING APPARATUS IN STARTING AN INTERNAL COMBUSTION ENGINE

BACKGROUND OF THE INVENTION

1. Field of the Invention

The present invention relates to a fuel injection controlling apparatus for an internal combustion engine, and particularly to a technology for controlling a fuel injection timing in starting an internal combustion engine.

2. Description of the Related Art

In an internal combustion engine such as a gasoline engine or the like, a fuel injection controlling apparatus for determining a fuel injection timing or a fuel injection amount (fuel injection period) in response to an operational condition of the engine. A so-called intake non-synchronous injection system for injecting fuel in synchronism with an intake stroke of each cylinder in starting the internal combustion engine is known as such a fuel injection controlling apparatus. The intake non-synchronous injection type fuel injection controlling apparatus is an apparatus for performing the fuel injection before an intake valve is opened.

By the way, since it is difficult to gasify the fuel such as gasoline or the like at an extremely low temperature and it is likely that the fuel would adhere to a wall surface or the like, in the case where the intake non-synchronous injection type fuel injection controlling apparatus starts the internal combustion engine at an extremely low temperature, it is necessary to inject a large amount of fuel exceeding an amount of fuel to be adhered to an intake port or the like in advance.

Then, the fuel that has been adhered to the wall surface of the intake port or the like is subjected to an intake vacuum pressure that is increased in accordance with the increase of an RPM of the engine after the completion of the start and is sucked into a combustion chamber. Accordingly, there is a fear that the mixture within the combustion chamber becomes an enriched atmosphere to cause the emission to be worse.

In order to solve such a problem, a fuel injection apparatus for an internal combustion engine is disclosed in Japanese Patent Application Laid-open No. Sho 62-210230. This fuel injection apparatus is provided with a start timing detecting means for detecting a start timing of the engine, a temperature detecting means for detecting a temperature of the engine, and a means for performing the synchronous fuel injection in an intake stroke on the basis of the outputs of the above-described start timing detecting means and the above-described temperature detecting means if the temperature of the engine in starting is less than a predetermined value and is an intake synchronous injection type fuel injection apparatus for injecting fuel in synchronism with a valve opening timing of an intake valve of each cylinder.

In the intake synchronous injection type fuel injection apparatus, since the fuel injection is performed in synchronism with the valve opening timing of the intake valve in starting the internal combustion engine, it is possible to feed a major portion of the fuel injected from the fuel injection valve directly into the combustion chamber. As a result, the amount of fuel adhered to the intake port or the like is decreased, and at the same time, the fuel increment value in starting becomes small in comparison with the intake non-synchronous injection type.

SUMMARY OF THE INVENTION

In such an intake synchronous type fuel injection apparatus, if the engine RPM is increased by the ignition of a certain cylinder in starting the internal combustion engine, the period of time of the intake stroke is shortened. It is therefore impossible to inject a necessary amount of fuel into the intake stroke and the fuel is injected after the intake valve has been closed. In this case, there is a fear that the amount of fuel fed into the combustion chamber is decreased, and at the same time, the amount of fuel adhered to the wall surface of the intake port or the like is increased to cause the startability to be worse, the emission to be worse and so on.

For example, in case of a four stroke four cylinder internal combustion engine in which the fuel injection is performed in the order of a fourth cylinder #4, a second cylinder #2, a first cylinder #1 and a third cylinder #3, as shown in FIG. 7, the fuel injection in starting is started from the fourth cylinder #4, and when the mixture in the fourth cylinder #4 is ignited, the engine RPM in the expansion stroke of the fourth cylinder #4 is increased.

In the first cylinder #1 which takes the intake stroke when the above-described fourth cylinder #4 is in the expansion stroke, the intake stroke period is shortened, and the fuel injection apparatus could not inject a predetermined amount of fuel within the intake stroke of the first cylinder #1 completely. In this case, the mixture within the first cylinder #1 becomes a lean condition and difficult to be ignited. As a result, the startability of the internal combustion engine becomes worse.

In view of the foregoing defects, an object of the present invention is to provide an intake synchronous injection type fuel injection controlling apparatus for performing a fuel injection in synchronism with an intake stroke in starting an internal combustion engine, which may positively feed necessary fuel to each cylinder to thereby improve the startability and the emission.

According to the present invention, in order to attain this object, the following means are adapted. According to the present invention, a start timing fuel injection controlling apparatus for an internal combustion engine is an apparatus in which fuel injection is performed in synchronism with an intake stroke of each cylinder in starting the internal combustion engine provided with a plurality of cylinders. The apparatus is provided with an injection number counter means for counting a total number obtained by summing the fuel injection number in all the cylinders from a start of an operation of the internal combustion engine; and a fuel injection timing changing means for advancing by a predetermined period a fuel injection start timing when the fuel injection number counted by said injection number counter means is equal to or more than a predetermined number.

In the thus constructed start timing fuel injection controlling apparatus for an internal combustion engine, when the operation of the internal combustion engine is started, the total number is obtained by the fuel injection numbers of all the cylinders by the injection number counter means. Then, referring to the counted value of said injection number counter means, in the case where the counted value is less than the predetermined value, the fuel injection timing changing means sets the fuel injection timing at a timing in synchronism with the intake stroke of each cylinder. In the case where the above-described value of said injection number counter means is equal to or more than the predetermined value, the fuel injection timing changing means sets the fuel injection start timing at a timing earlier by the predetermined period than the intake stroke start timing of each cylinder.

In this case, in the case where the mixture of the cylinder in which the fuel injection is performed is ignited when the above-described counted value is less than the predetermined value, the engine RPM is increased in an expansion stroke for the cylinder. Accordingly, the intake stroke of the cylinder in which the fuel injection is performed after that is shortened. However, when the above-described counted value is equal to or more than the predetermined value, the fuel injection start timing is advanced by the predetermined period. Accordingly, the fuel injection is completed within the intake stroke.

Accordingly, according to the present invention, in starting the internal combustion engine, even if the mixture in some cylinder is ignited to increase the engine RPM and the intake stroke of the cylinder in which the fuel injection is to be performed after that is shortened, the reduction in the amount of fuel to be fed into the cylinder is suppressed. As a result, the mixture which is likely to be ignited is formed in each cylinder so that the startability of the internal combustion engine is enhanced and the degradation of the emission is suppressed.

Incidentally, it is possible to modify the above-described fuel injection timing changing means so as to further advance the fuel injection start timing in accordance with the increased number of the fuel injections. Namely, a period of cranking from the start of the operation of the internal combustion engine is elongated. When the fuel injection number is increased, the number of the cylinders in which the ignition of the mixture is successfully attained is also increased. In accordance with this, the engine RPM is increased. As a result, the intake stroke of each cylinder is shortened. In this case, if the fuel injection start timing is advanced in accordance with the increase of the fuel injections, the fuel injection is completed within the intake stroke in each cylinder. Thus, the reduction in the amount of the fuel to be fed into each cylinder is suppressed.

Next, according to the present invention, a start timing fuel injection controlling apparatus for an internal combustion engine is provided, in which fuel injection is performed in synchronism with an intake stroke of each cylinder in starting the internal combustion engine provided with a plurality of cylinders, and may comprise an ignition condition detecting means for detecting ignition or misfire of each cylinder and a fuel injection timing changing means for advancing a fuel injection start timing by a predetermined period in the case where the ignition or misfire is detected by said ignition condition detecting means.

In the thus constructed start timing fuel injection controlling apparatus, when the internal combustion engine is started, the ignition condition detecting means supervises the combustion condition in each cylinder and judges the ignition or misfire of the mixture in each cylinder. Then, when the above-described ignition condition detecting means judges the misfire of some cylinder, the fuel injection timing changing means sets the fuel injection timing at a timing in synchronism with the intake stroke of each cylinder. On the other hand, when the above-described ignition condition detecting means judges the ignition of some cylinder, the fuel injection timing changing means sets the fuel injection start timing at a timing earlier by the predetermined period than the intake stroke start timing of each cylinder.

In this case, when the mixture is ignited in some cylinder, the engine RPM is increased in the expansion stroke in the cylinder. Accordingly, the intake stroke of the cylinder in which the fuel injection is performed after that is shortened. However, when the fuel injection start timing is advanced by the predetermined period by the above-described fuel injection timing changing means. Accordingly, the fuel injection is completed within the intake stroke.

As a result, in the cylinder in which the fuel injection is performed after the cylinder in which the ignition of the mixture is successfully performed, even if the intake stroke is shortened by the increase of the engine RPM, the reduction in the amount of fuel to be fed into the cylinder is suppressed.

It is possible to provide an injection number counter means for counting a total number obtained by summing the fuel injection number of all the cylinders after the ignition is detected by said ignition condition detecting means. The fuel injection timing changing means advances the fuel injection start timing in accordance with the increased number counted by said fuel injection number counter means.

DETAILED DESCRIPTION OF PREFERRED EMBODIMENTS

Embodiment Mode 1

An embodiment mode of a start timing fuel injection controlling apparatus for an internal combustion engine according to the present invention will now be described with reference to the drawings.

Figure 2:
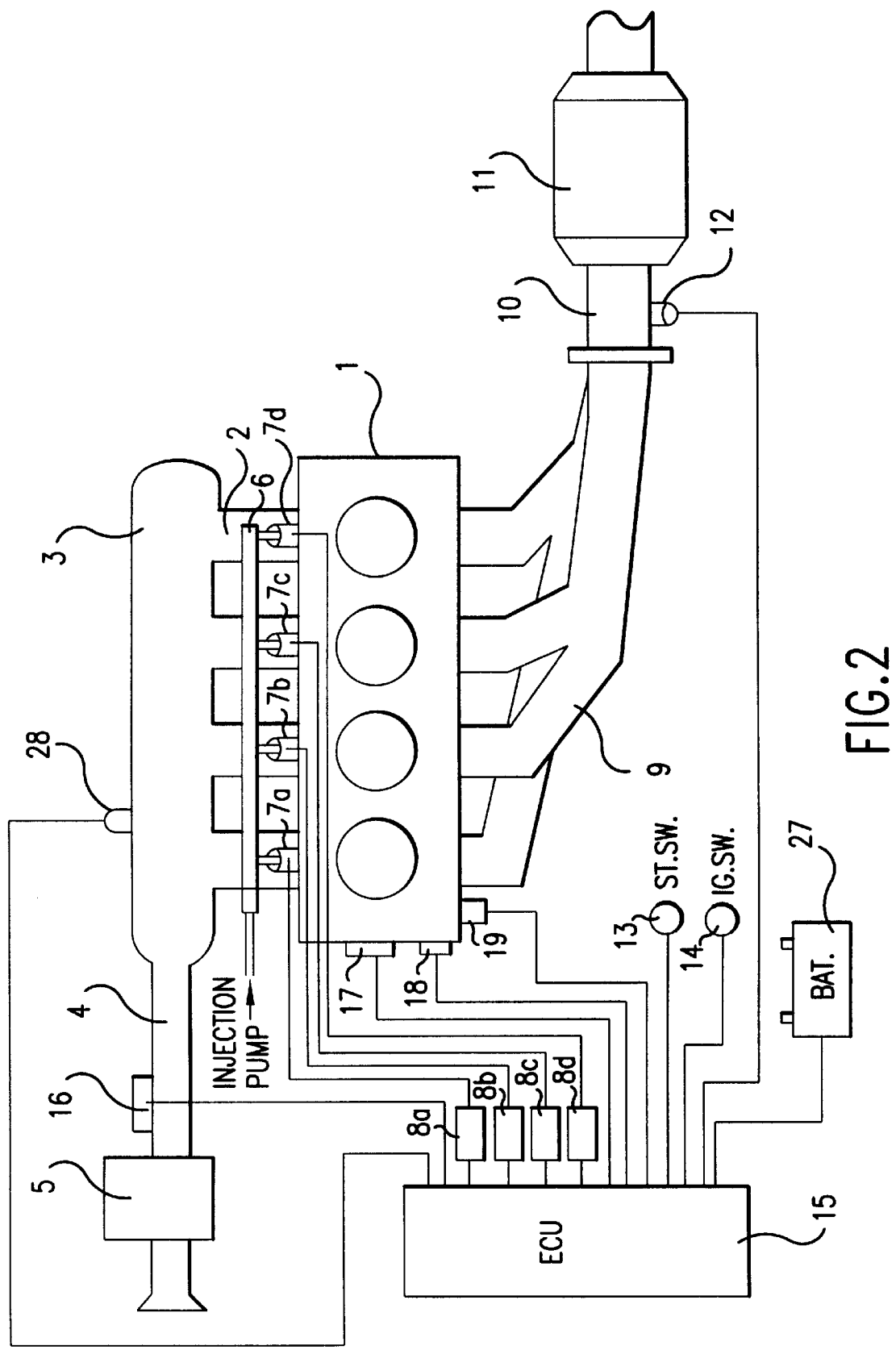
FIG. 2 is a view showing a schematic structure of an internal combustion engine to which a start timing fuel injection controlling apparatus for an internal combustion engine according to the present invention is applied.

FIG. 2 is a view showing a schematic structure of an internal combustion engine to which the present invention is applied. The internal combustion engine shown in the figure is a four-cycle four-cylinder internal combustion engine 1. A serge tank 3 is connected through an intake manifold 2 to the internal combustion engine 1, and at the same time an exhaust pipe 10 is connected through an exhaust manifold 9 to the engine 1.

The serge tank 3 is connected through an intake pipe 4 to an air cleaner box 5 for taking new air that has passed through the air cleaner box 5 and for distributing the air to each cylinder of the internal combustion engine 1 through the intake manifold 2. Then, mounted on the above-described intake pipe 4 are an air flow meter 16 for outputting an electric signal corresponding to the intake air mass that flows through the intake pipe 4 and an intake air temperature sensor 29 for outputting an electric signal corresponding to a temperature of the air that flows through the intake pipe 4. Mounted on the above-described serge tank 3 is a vacuum sensor 28 for outputting an electric signal corresponding to a pressure within the serge tank 3.

Subsequently, fuel injection valves 7a, 7b, 7c and 7d (hereinafter generally referred to as a fuel injection valve 7) are mounted on respective branch pipes of the above-described intake manifold 2. A fuel distribution pipe 6 is connected to these fuel injection valves 7. The above-described fuel distribution pipe 6 serves to distribute to the fuel injection valves 7 the fuel that has been pressurized and fed by a fuel pump (not shown).

The above-described fuel injection valves 7 are connected to driving circuits 8a, 8b, 8c and 8d (hereinafter generally referred to as a driving circuit 8). The fuel injection valves 7 open when a drive current is applied thereto from the above-described driving circuits 8 and inject into the intake manifold 2 the fuel that has been fed from the fuel distribution pipe 6.

Next, an exhaust gas purifying catalyst 11 is provided in the midway of the above-described exhaust pipe 10 for purifying components such as NOx or HC contained in the exhaust gas discharged from the internal combustion engine 1. An air/fuel ratio sensor 12 for outputting a current corresponding to an air/fuel ratio of the exhaust gas that flows through the exhaust pipe 10 is mounted on the exhaust pipe 10 upstream of this exhaust purifying catalyst 11.

Subsequently, mounted on the above-described internal combustion engine 1 are a crank position sensor 17 for outputting an electric signal whenever a crankshaft (not shown) rotates through a predetermined angle (for example, ten degrees), a cam position sensor 18 for outputting an electric signal when a cam shaft (not shown) is a predetermined position, and a water temperature sensor 19 for outputting an electric signal corresponding to a temperature of the cooling water.

The above-described cam position sensor 18 is an electromagnetic pickup type sensor for outputting an electric signal before a compression top dead center of the cylinder which is used as a reference. At this time, for example, the signal that is outputted from the above-described crank position sensor 17 immediately after the output of the cam position sensor 18 is set at ten degrees before the compression top dead center of the above-described reference cylinder.

Then, the above-described air/fuel sensor 12, the above-described air flow meter 16, the above-described crank position sensor 17, the above-described cam position sensor 18, the above-described water temperature sensor 19, the above-described vacuum sensor 28, the above-described intake air temperature sensor 29 are connected to the electronic control unit (ECU) 15 for controlling the engine so that the output signals of the respective sensors are inputted into the above-described ECU 15. Furthermore, a starter switch 13, an ignition switch 14 and a battery 27 are connected to the above-described ECU 15 so that an on/off signal of the starter switch 13, an on/off signal of the ignition switch 14 and a voltage value of the battery 27 are inputted thereinto.

Figure 3:
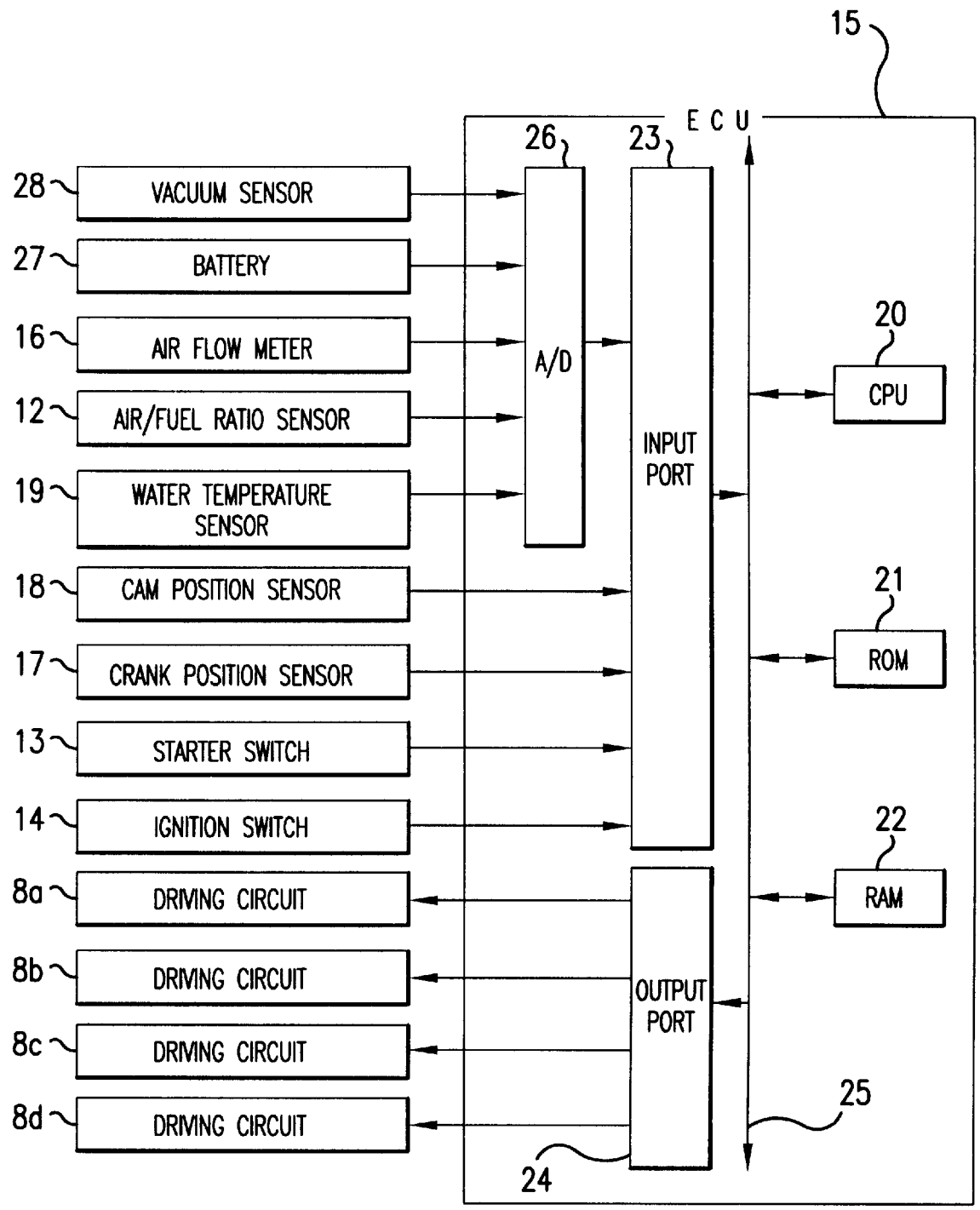
FIG. 3 is a block diagram showing an internal structure of an ECU.

As shown in FIG. 3, the above-described ECU 15 is provided with a CPU 20, a ROM 21, a RAM 22, an input port 23 and an output port 24 which are connected to each other through bidirectional buses 25 and is also provided with an A/D convertor (A/D) 26 connected to the above-described input port 23.

The above-described input port 23 receives the signals from the cam position sensor 18, the crank position sensor 17, the starter switch 13, and the ignition switch 14 and sends these signals to the CPU 20 or the RAM 22. Furthermore, the input port 23 receives through the A/D convertor 26 the signals from the air flow meter 16, the air/fuel ratio sensor 12, the water temperature sensor 19, the battery 27, the vacuum sensor 28 and the intake air temperature sensor 29 and sends these signals to the CPU 20 or the RAM 22.

The above-described ROM 21 stores application programs such as a start timing fuel injection amount controlling routine for determining an amount of fuel injection in starting, a start time fuel injection timing controlling routine for determining a fuel injection timing in starting, a fuel injection amount controlling routine for determining a fuel injection amount after starting, a fuel injection timing controlling routine for determining a fuel injection timing after starting, or an ignition timing controlling routine for determining an ignition timing and various control maps. The above-described controlling maps are, for example, a star timing fuel injection timing controlling map for determining a fuel injection start timing in starting the internal combustion engine 1 or the like.

The above-described RAM 22 stores the output signals from the respective sensors, a calculation result of the CPU 20 or the like. The above-described calculation result is, for example, an engine RPM calculated in accordance with the output signal of the crank position sensor 17. The output signals from the respective sensors, the calculation result of the CPU 20 and the like are renewed whenever the crank position sensor 17 outputs the signal.

Furthermore, the RAM 22 stores a start identification flag that is set ("1") in starting the internal combustion engine 1 and reset ("0") upon the completion of the start, and at the same time stores a sum of the number of the fuel injections in all the cylinders from the start of the starting operation of the internal combustion engine 1.

Subsequently, the above-described CPU 20 operates in accordance with the application program stored in the above-described ROM 21, calculates the fuel injection timing, the fuel injection amount or the like of each cylinder on the basis of the control map or the output signal of each sensor stored in the RAM 22, and controls the driving circuit 8 in accordance with the fuel injection timing or the fuel injection amount calculated.

In this case, if the internal combustion engine 1 is under the normal operation condition, the CPU 20 executes the fuel injection timing controlling routine and the fuel injection amount controlling routine stored in the ROM 21, calculates the fuel injection amount (the opening period of the fuel injection valve 7) in correspondence with the output signals of each sensor, and at the same time calculates the fuel injection start timing of each cylinder.

Also, if the internal combustion engine 1 is under the starting condition, the CPU 20 executes the start timing fuel injection amount controlling routine and the start timing fuel injection timing controlling routine stored in the ROM 21, and calculates the fuel injection amount and the fuel injection timing of each cylinder. For example, the fuel injection amount in starting is calculated in correspondence with the cooling water temperature, the battery voltage, the intake pipe pressure or the like in starting.

Then, the fuel injection timing in starting is calculated as follows. Namely, the CPU 20 stores the total number of the fuel injections of all the cylinders (hereinafter referred to as "total fuel injection number") in the RAM 22 from starting and increments by one every time of fuel injection. Subsequently, the CPU 20 judges whether or not the total number of the fuel injections after the increment is not greater than the number of the cylinders of the internal combustion engine 1 whenever the total number of the fuel injections stored in the RAM 22 is incremented.

When the above-described total number of the fuel injections is less than the above-described predetermined number, the CPU 20 sets the fuel injection start timing in synchronism with the intake stroke of each cylinder, and when the above-described total number of the fuel injections is not less than the above-described predetermined number, the CPU 20 sets the above-described fuel injection start timing earlier by a predetermined period than the intake stroke starting period of each cylinder. The above-described predetermined period is set so that the fuel injection completion timing falls within the intake stroke of each cylinder.

Figure 1:
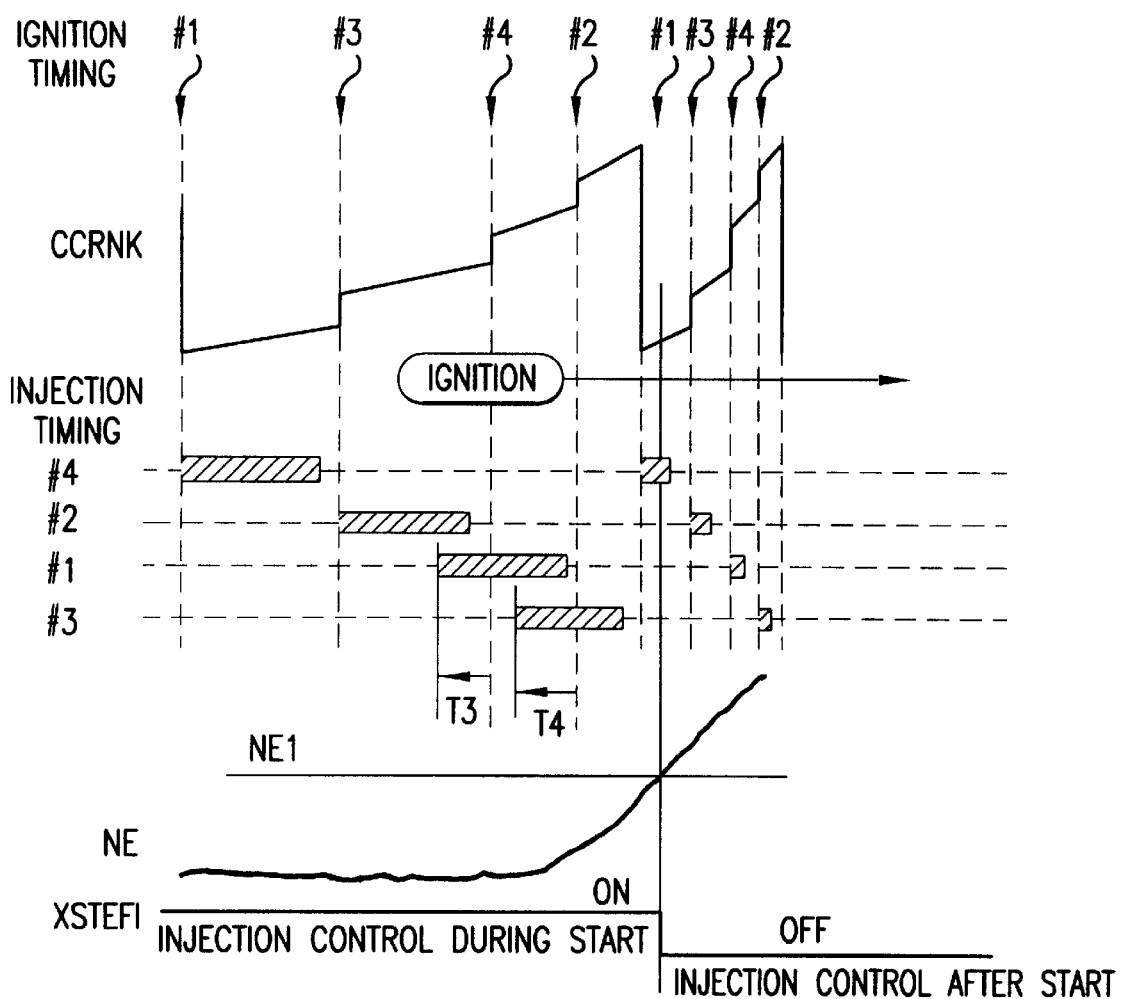
FIG. 1 is a timing chart showing a fuel injection timing of each cylinder in starting.

For example, in a four stroke four cylinder internal combustion engine, in the case where the fuel injection is performed in the order of a fourth cylinder #4, a second cylinder #2, a first cylinder #1 and a third cylinder #3, as shown in FIG. 1, with respect to the first two fuel injections (the fuel injection for the fourth cylinder #4 and the second cylinder #2 in the figure), the CPU 20 sets the fuel injection start timing in synchronism with the intake stroke of each cylinder.

Then, with respect to the third fuel injection, since the intake stroke of the cylinder (first cylinder #1 in the figure) is overlapped with the expansion stroke of the fourth cylinder #4 (the cylinder in which the first fuel injection has been performed), there is a possibility that the engine RPM is increased by the ignition of the fourth cylinder #4 so that the intake stroke of the first cylinder #1 would be shortened. For this reason, the CPU 20 sets the fuel injection start timing for the first cylinder #1 at an earlier timing by a predetermined period T3 than the intake stroke starting timing of the first cylinder #1.

Subsequently, with respect to the fourth fuel injection (the fuel injection for the third cylinder #3 in the figure), the CPU 20 sets the fuel injection start timing at a timing further earlier than the third fuel injection (at a timing earlier by a predetermined period T4 than the intake stroke starting timing of the third cylinder #3 in the figure) so that the fuel injection completion timing may fall within the intake stroke.

In the case where the ignition occurs in the fourth cylinder #4 in which the first fuel injection is first performed, the engine RPM is increased in the expansion stroke of the fourth cylinder #4. Accordingly, the intake stroke in the first cylinder #1 which takes the intake stroke in the expansion stroke of the fourth cylinder #4 is shortened. However, since the fuel injection start timing of the first cylinder #1 is set earlier by the predetermined period T3 than the intake stroke starting timing of the first cylinder #1, the fuel injection is completed within the intake stroke of the first cylinder #1.

In this case, the fuel injection is started before the intake valve (not shown) of the first cylinder #1 is opened, and the fuel injection is completed for the opening period of the intake valve. Thus, a part of the fuel that has been injected before the opening of the intake valve is adhered to the intake port wall surface or the like in the vicinity of the intake valve. However, since a major part thereof is sucked into the first cylinder #1 by the vacuum pressure generated after the opening of the intake valve, the reduction in the amount of the fuel to be fed into the first cylinder #1 is suppressed.

Thus, the CPU 20 executes the application program of the ROM 21 to realize the injection number counter means and the fuel injection timing changing means according to the present invention.

Incidentally, the above-described predetermined value may be a fixed value determined in advance or may be a variable value set in accordance with conditions such as a cooling water temperature, a battery voltage, or an intake temperature in starting. Also, the above-described predetermined period may be a fixed value determined in advance or may be a variable value set in accordance with conditions such as a cooling water temperature, a battery voltage, or an intake temperature in starting.

The operation and effect of the start timing fuel injection controlling apparatus for the internal combustion engine according to the present embodiment will now be described.

In starting the internal combustion engine 1, when the ON signal of the ignition switch 13 and the ON signal of the starter switch 14 are inputted, the CPU 20 calculates the engine RPM in accordance with the output signal of the crank position sensor 18. Then, if the above-described engine RPM is less than a predetermined RPM, the CPU 20 judges that the internal combustion engine 1 is under the starting condition, and sets the start identification flag "1" in a predetermined region of the RAM 22.

Also, immediately after the output of the signal from the cam position sensor 18, the CPU 20 judges that the signal outputted from the crank position sensor 17 is a signal representative of 10° before the compression top dead center of the reference cylinder, and judges the compression top dead center of the cylinders other than the reference cylinder.

Figure 4:
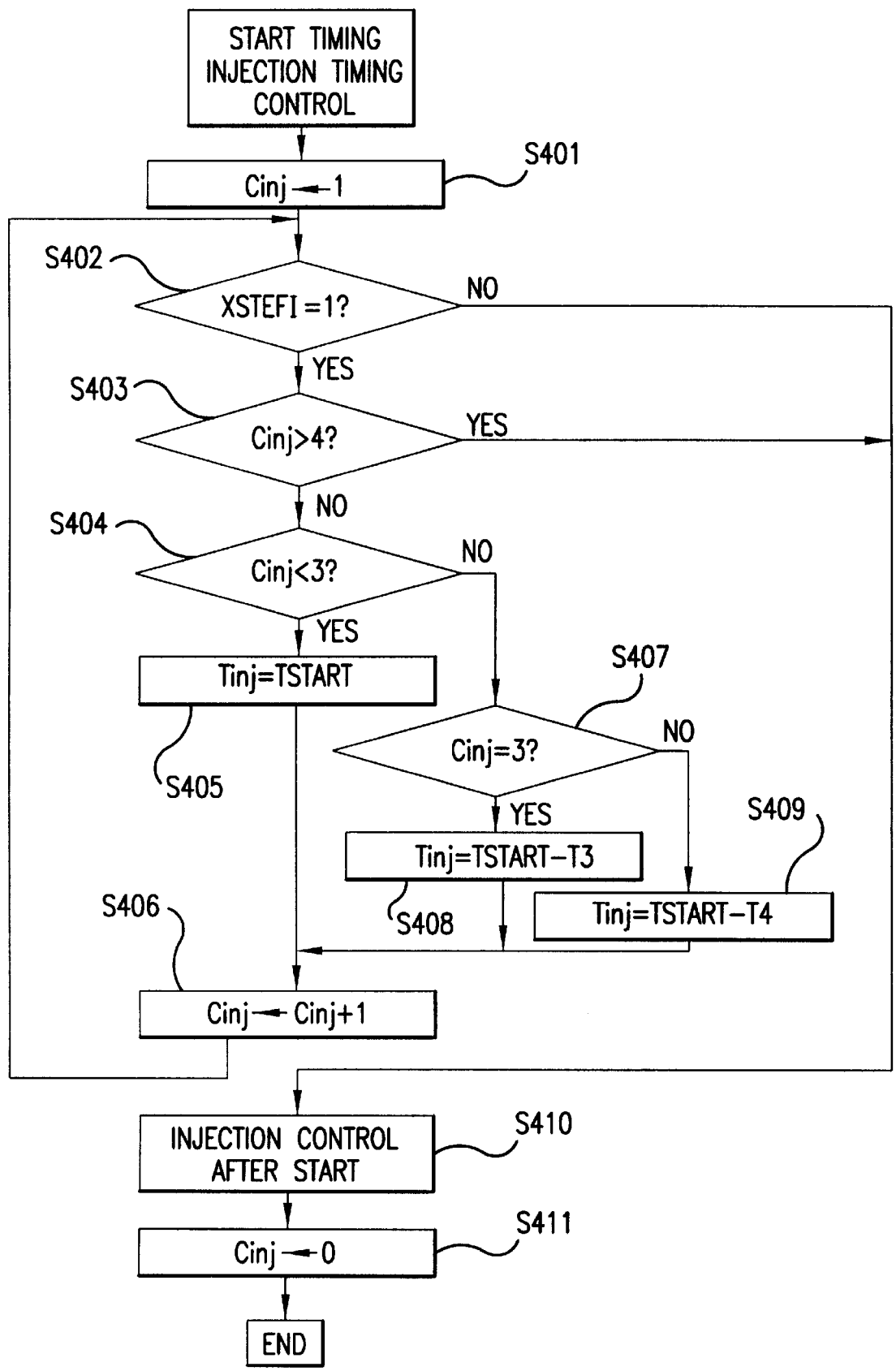
FIG. 4 is a flowchart showing a start timing fuel injection period controlling routine.

Subsequently, the CPU 20 executes the start timing fuel injection amount controlling routine, determines the fuel injection amount (the fuel injection period) for each cylinder, and at the same time, executes the start timing fuel injection timing controlling routine shown in FIG. 4, thereby determining the fuel injection timing for each cylinder.

In the above-described start timing fuel injection timing controlling routine, the CPU 20 first accesses the RAM 22 and writes "1" representative of the total fuel injection number: Cinj (S401). Subsequently, the CPU 20 accesses the RAM 22 and judges whether or not the value of the start identification flag (XSTEFI) is set at "1" (S402).

In the above-described S402, if the CPU 20 judges that the value of the start identification flag (XSTEFI) is set at "1", and advances to S403 to judge whether or not the total fuel injection number Cinj stored in the RAM 22 is greater than four. In this case, since the injection is the first fuel injection, and the total fuel injection number CSTINJ is "1", the CPU 20 judges that the total fuel injection number Cinj is equal to or less than four and advances to S404.

In the above-described S404, the CPU 20 judges whether or not the total number Cinj of the fuel injection stored in the RAM 22 exceeds three. In this case, since the value of the fuel injection total number Cinj is "1" as described above, the CPU 20 judges that the fuel injection total number Cinj is less than three and advances to S405.

In the above-described S405, the CPU 20 sets the fuel injection start timing Tinj at a timing in synchronism with the start timing of the intake stroke Tstart. Then, the CPU 20 advances to S406 and increments by one the value of the total fuel injection number Cinj stored in the RAM 22 (rewriting the value of the total fuel injection number Cinj to "2").

Thus, the fuel injection of the cylinder (first cylinder) in which the fuel injection is first performed is the intake synchronous injection in synchronism with the intake stroke. Subsequently, the CPU 20 returns to the above-described S402 and determines the fuel injection timing of the cylinder (second cylinder) in which the injection is performed next to the above-described first cylinder. In this case, the CPU 20 judges that the total fuel injection number Cinj (=2) is equal to or less than four, subsequently judges in Step 404 that the total fuel injection number Cinj (=2) is less than three and advances to S405.

In the above-described S405, the CPU 20 sets the fuel injection start timing Tinj at a timing in synchronism with the start timing of the intake stroke Tstart of the second cylinder. Subsequently, the CPU 20 accesses the RAM 22 in S406, and increments by one the value of the total fuel injection number Cinj (rewriting the value of the total fuel injection number Cinj to "3").

The CPU 20 returns back to S402 after determining the fuel injection timing for the second cylinder and determines the fuel injection timing for a cylinder (third cylinder) in which the fuel injection is to be performed next to the second cylinder. In this case, in S403, the CPU 20 judges that the total fuel injection number Cinj (=3) is less than four, subsequently in S404, the CPU 20 judges that the total fuel injection number Cinj (=3) is not less than three, and the CPU 20 advances to S407 and judges whether or not the total fuel injection number Cinj (=3) is "3".

In this case, since the value of the total fuel injection number Cinj is "3", the CPU 20 judges in the above-described S407 that the value of the total fuel injection number Cinj is "3" and advances to S408.

In the above-described S408, the CPU 20 sets the fuel injection start timing Tinj at a timing earlier by a first predetermined period T3 than the intake stroke start timing Tstart of the third cylinder. Then, the CPU 20 advances to S406, and increments by one the value of the total fuel injection number Cinj stored in the RAM 22 (rewriting the value of the total fuel injection number Cinj to "4").

Thus, when the fuel injection timing of the above-described third cylinder is determined, the CPU 20 returns back to S402 and determines the fuel injection timing for a cylinder (fourth cylinder) in which the fuel injection is to be performed next to the third cylinder. In this case, in S403, the CPU 20 judges that the total fuel injection number Cinj (=4) is less than four, subsequently in S404, the CPU 20 judges that the total fuel injection number Cinj (=3) is not less than three, the CPU 20 judges in S407 that the total fuel injection number Cinj (=3) is "3" and advances to S409.

In the above-described S409, the CPU 20 sets the fuel injection start timing Tinj at a timing earlier by a second predetermined period T4 than the intake stroke start timing Tstart of the fourth cylinder. In this case, the second predetermined period T4 is set to be longer than the above-described predetermined period T3, and the fuel injection start timing of the fourth cylinder is set to be earlier than that of the above-described third cylinder.

Then, the CPU 20 advances to S406, and increments by one the value of the total fuel injection number Cinj stored in RAM 22 (rewriting the value of the total fuel injection number Cinj to "5").

When the first fuel injection timing has been thus determined for all the cylinders of the internal combustion engine 1, the second fuel injection timing for the above-described first cylinder is to be determined. In this case, the CPU 20 judges in S403 of the start timing fuel injection timing controlling routine of FIG. 4 that the total fuel injection number Cinj exceeds four and advances to S410.

In step 410, the CPU 20 executes the fuel injection amount controlling routine and the fuel injection timing controlling routine after the start of the engine, and subsequently resets the total fuel injection number Cinj stored in the RAM 22 in S411 (rewriting the value of the total fuel injection number Cinj to "0").

Accordingly, in accordance with the present embodiment, in case of the four stroke four cylinder internal combustion engine 1, the cylinder in which the fuel injection is first performed is in the expansion stroke in the intake stroke of the third cylinder. Accordingly, when the mixture is ignited in the above-described first cylinder, the engine RPM is increased and the intake stroke of the third stroke is shortened. However, the fuel injection start timing of the third cylinder is advanced by the predetermined period and the fuel injection is started before the intake valve is opened whereby the fuel injection is completed for the intake stroke of the third cylinder and the necessary amount of fuel may be fed into the third cylinder.

Incidentally, in the present embodiment, there has been described an example of the four cylinder internal combustion engine in which the fuel injection timing of the third cylinder and the cylinder after that is advanced. However, the invention is not limited to the third cylinder. If it is the cylinder which takes the intake stroke upon the expansion stroke of the cylinder in which the fuel injection is first performed or the cylinder after that, any cylinder may be used. In this case, this may be changed depending upon the cooling water temperature or the battery voltage in starting. For instance, in the case where the cooling water temperature is low, the cylinder after the third cylinder may be selected and in the case where the cooling water temperature is high, the third cylinder may be selected.

Also, in the present embodiment, the four cylinder internal combustion engine has been exemplified but the invention is not limited thereto. An internal combustion engine having four or more cylinders or less than four may be used. In short, the fuel injection timing of the cylinder which takes the intake stroke upon the expansion stroke of the cylinder in which the fuel injection is first performed and the cylinder after that or the cylinder in which the fuel injection is performed after the cylinder which takes the intake stroke upon the expansion stroke of the cylinder in which the fuel injection is first performed is advanced so that the fuel injection is completed within the intake stroke.

Embodiment Mode 2

In the above-described embodiment, an example for controlling the fuel injection timing by using as a parameter of the total fuel injection number Cinj for all the cylinders from the start of the operation of the internal combustion engine 1 has been described. The fuel injection timing may be controlled by using the ignition condition of each cylinder as a parameter.

Figure 5:
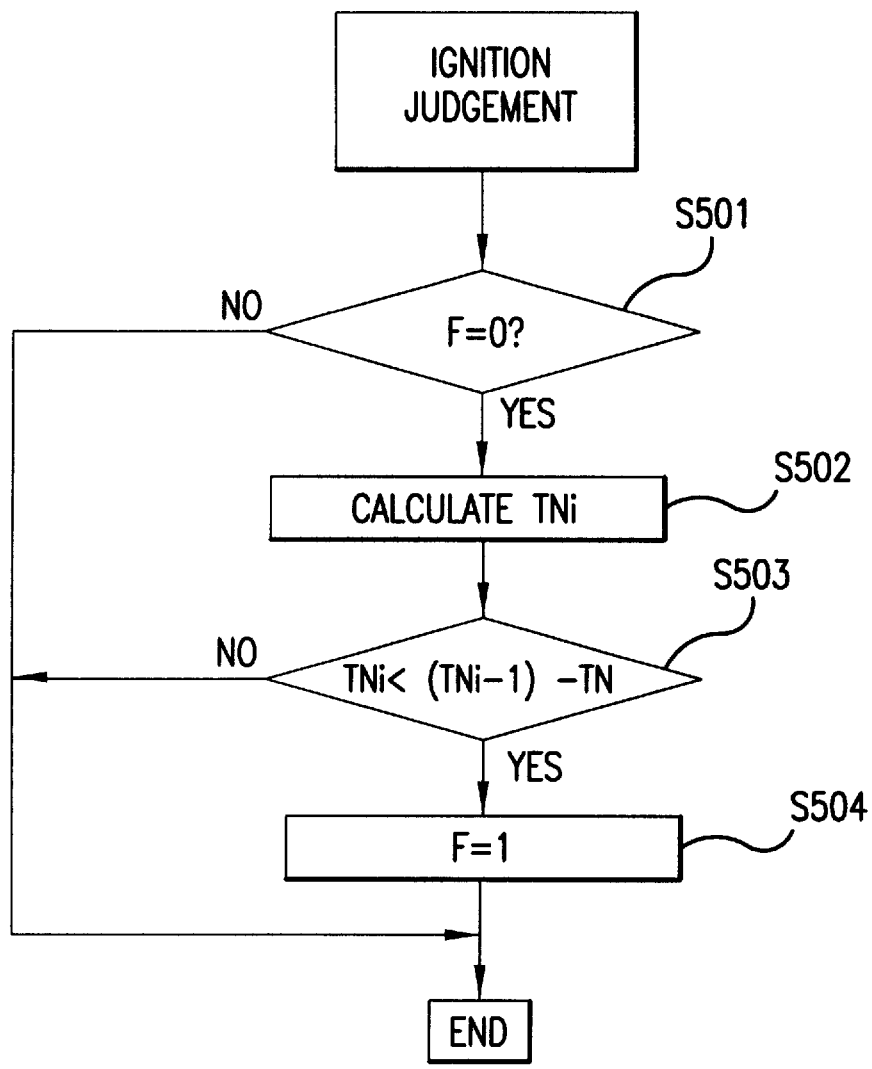
FIG. 5 is a flowchart showing an ignition judgement routine in accordance with embodiment 2.
Figure 6:
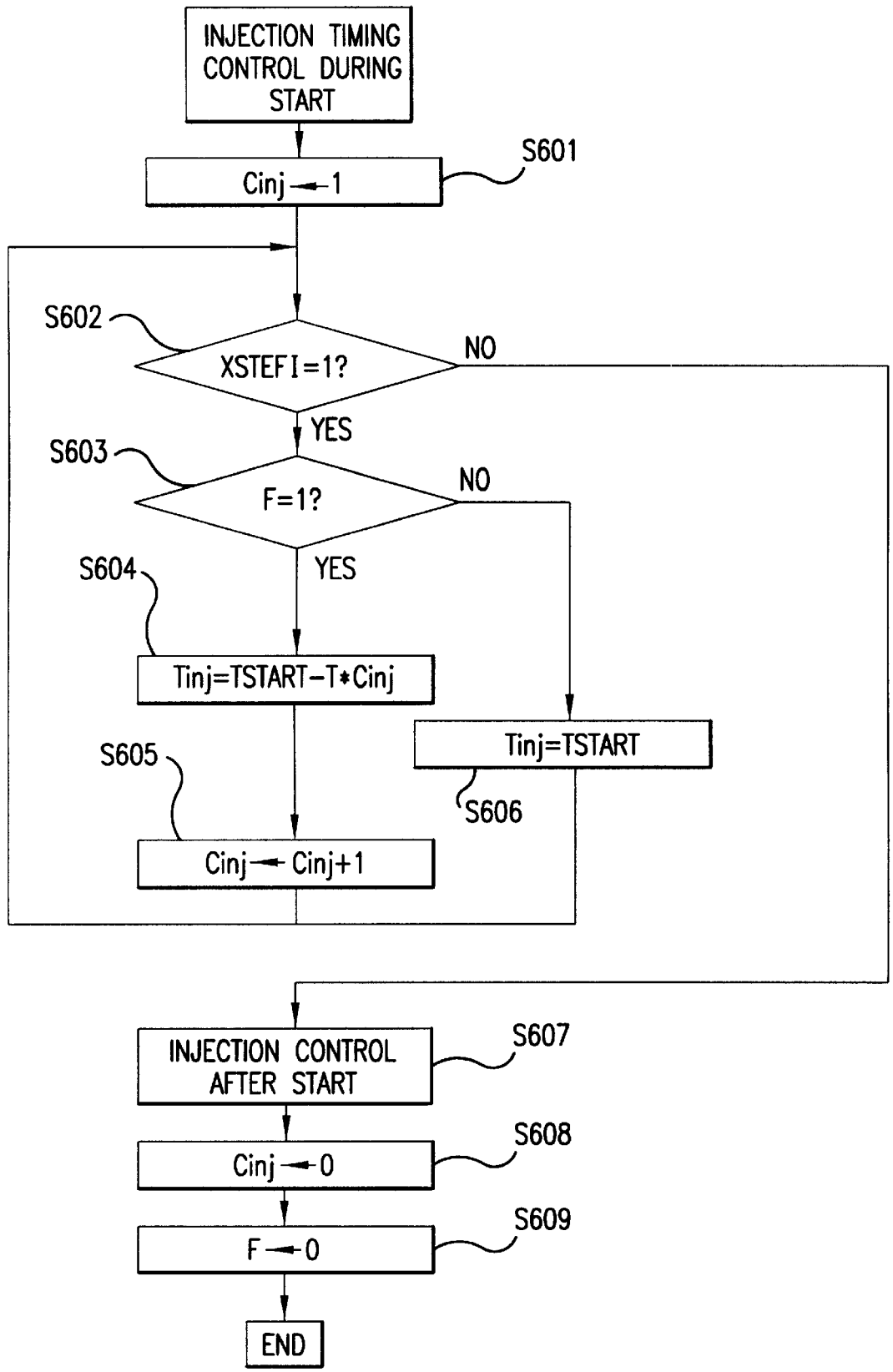
FIG. 6 is a flowchart showing a start timing fuel injection timing controlling routing in accordance with embodiment 2.
Figure 7:
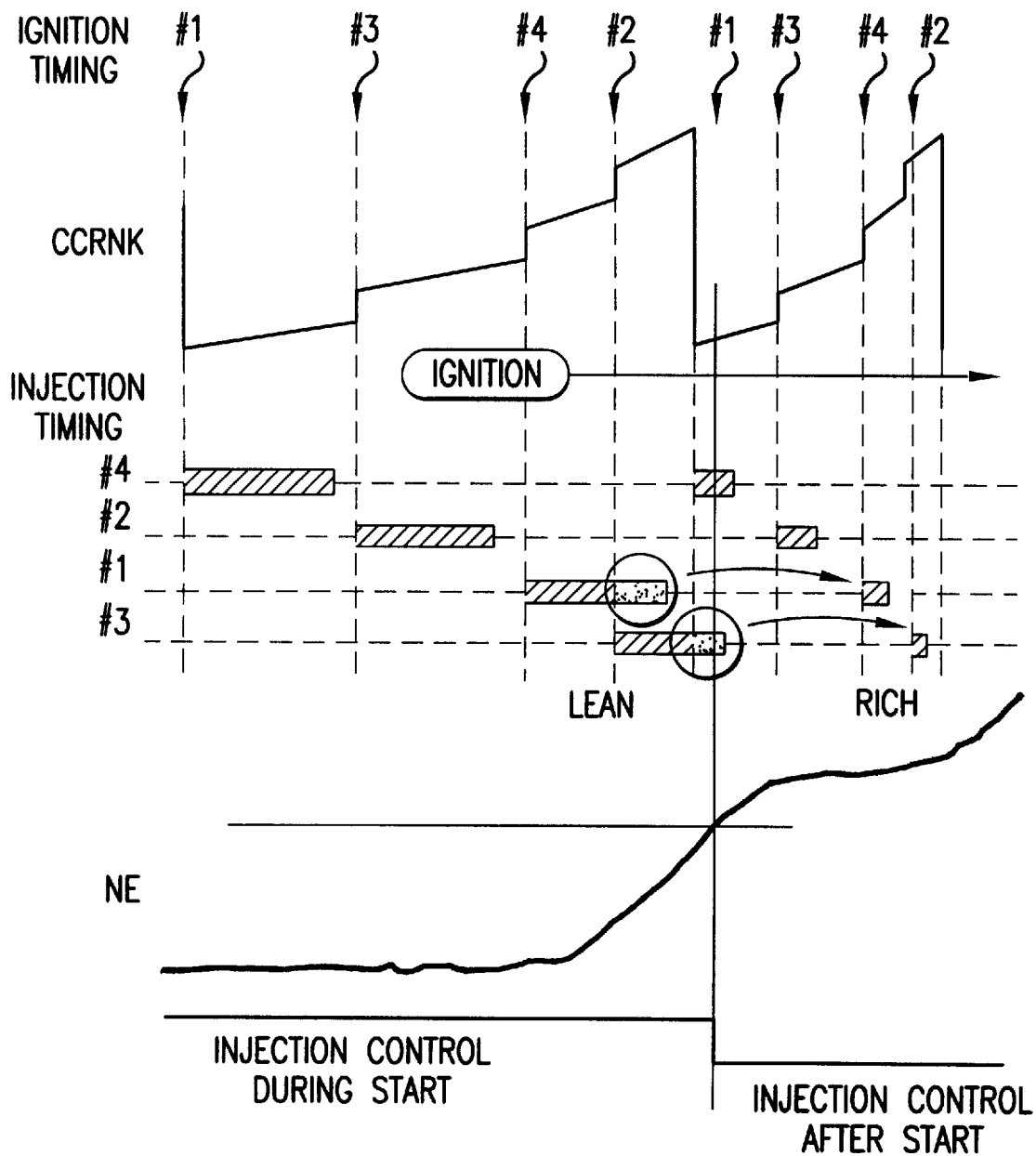
FIG. 7 is a timing chart showing a fuel injection timing of each cylinder in a conventional intake synchronous injection system.

In this case, the CPU 20 executes the ignition judgement routine shown in FIG. 5 and the start timing fuel injection timing controlling routine shown in FIG. 6 and determines the fuel injection timing in starting the internal combustion engine 1.

First of all, the CPU 20 executes the above-described ignition judgement routine whenever the ignition plug (not shown) of each cylinder ignites. Referring first to the value of the ignition condition judgement flag F stored in the RAM 22, the CPU 20 judges whether or not there exists the cylinder which has been ignited (S501).

In the above-described S501, if the value of the ignition condition judgement flag F is "0", the CPU 20 judges that there is no cylinder that has been ignited (the mixture is not ignited in none of the cylinders) and advances to S502.

In the above-described S502, the CPU 20 calculates a time TNi taken from the time when the crank position sensor 17 outputs the signal representative of the compression top dead center of each cylinder until it outputs a signal representative of an expansion bottom dead center (hereinafter referred to as an expansion stroke time) and advances to S503.

In the above-described S503, for each cylinder, the CPU 20 compares the expansion stroke time TNi in the current cycle with a value (TNi–1)–TN obtained by subtracting a predetermined time TN from the expansion stroke time TNi–1 in the previous cycle.

In the above-described S503, if TNi is shorter than ((TNi–1)–TN), the CPU 20 judges that the mixture within the cylinder is ignited and advances to S504.

In the above-described S504, the CPU 20 rewrites the value of the ignition condition judgement flag F stored in the RAM 22 to "1".

On the other hand, the above-described S501, if the value of the ignition condition judgement flag F is "1", the CPU 20 judges that there exists the cylinder that has been ignited and completes the execution of the ignition judgement routine.

Also, in the above-described S503, if the current expansion stroke time TNi is longer than ((TNi–1)–TN), the CPU 20 judges that the mixture in the cylinder has not been normally ignited.

Thus, the CPU 20 realizes the ignition condition detecting means according to the present invention by executing the ignition judgment routine.

Also, when the CPU detects the start of the operation of the internal combustion engine 1, it executes the start timing fuel injection amount controlling routine and at the same time, executes the start timing fuel injection timing controlling routine shown in FIG. 6 to determine the fuel injection amount and the fuel injection timing of the cylinder in which the fuel injection is to be first performed.

For example, in the case where the fuel injection timing of the cylinder (first cylinder) in which the fuel injection is to be first performed, first of all, the CPU 20 accesses the RAM 22 and rewrites "1" to the total fuel injection number Cinj (S601). Subsequently, the CPU 20 judges whether or not the value of the start judgement flag (XSTEFI) of the RAM 22 is set at "1" (S602).

In the above-described S602, if the CPU 20 judges that the value of the start judgement flag (XSTEFI) is "1", it advances to S603 and judges whether or not the value of the ignition condition judgment flag F of the RAM 22 is "1".

In this case, since the ignition is the first ignition and there is no cylinder that has been ignited, the value of the ignition condition judgement flag F is "0". Accordingly, in the above-described S603, the CPU 20 judges that the value of the ignition condition judgement flag F is "0" and advances to S606.

In the above-described step 606, the CPU 20 sets the fuel injection start timing Tinj at a timing in synchronism with the intake stroke start timing Tstart of the first cylinder.

Subsequently, the CPU 20 returns back to the above-described S602 and determines the fuel injection timing of the cylinder (second cylinder) in which the fuel injection is to be injected next to the first cylinder. In case of the four cylinder internal combustion engine 1, the ignition is not performed in the above-described first cylinder at the time when the fuel injection timing for the second cylinder is determined, and the value of the ignition condition judgement flag F is "0". Accordingly, in S603, the CPU 20 judges that the value of the ignition condition judgement flag F is not "1" and advances to S607. Then, in the above-described S607, the CPU 20 sets the fuel injection start timing Tinj for the above-described second cylinder at a timing in synchronism with the intake stroke start timing Tstart.

After the fuel injection timing for the above-described second cylinder has been determined, the CPU 20 returns back to S602 and determines the fuel injection timing of the cylinder (third cylinder) in which the fuel injection is to be injected next to the above-described second cylinder. In this case, the ignition is not performed in the above-described first cylinder at the time when the fuel injection timing for the third cylinder is determined, and the value of the ignition condition judgement flag F is "0". Accordingly, in S603, the CPU 20 judges that the value of the ignition condition judgement flag F is not "1" and advances to S607. Then, in the above-described S607, the CPU 20 sets the fuel injection start timing Tinj for the above-described third cylinder at a timing in synchronism with the intake stroke start timing Tstart.

After the fuel injection timing for the above-described third cylinder has been determined, the CPU 20 returns back to S602 and determines the fuel injection timing of the cylinder (fourth cylinder) in which the fuel injection is to be injected next to the above-described third cylinder. In this case, the ignition is not performed in the above-described first cylinder at the time when the fuel injection timing for the fourth cylinder is determined, and the value of the ignition condition judgement flag F is "0". Accordingly, in S603, the CPU 20 judges that the value of the ignition condition judgement flag F is not "1" and advances to S607. Then, in the above-described S607, the CPU 20 sets the fuel injection start timing Tinj for the above-described fourth cylinder at a timing in synchronism with the intake stroke start timing Tstart.

When the first fuel injection for the four cylinders has been completed, the CPU 20 returns back to S602 and determine the second fuel injection timing for the above-described first cylinder. In this case, if the mixture in the above-described first cylinder, in the above-described S603, the CPU 20 judges that the value of the ignition condition judgement flag F is "1" and advances to S604.

In the above-described S604, the CPU 20 sets the fuel injection start timing Tinj at a timing earlier by a predetermined period T*Cinj than the start timing Tstart of the intake stroke, where the above-described predetermined period T*Cinj is the value (T) obtained by multiplying the total fuel injection number Cinj (=1) by a coefficient T, and the fuel injection start timing Tinj is Tstart–T.

Subsequently, the CPU 20 advances to S605, and increments by one the value of the total fuel injection number Cinj stored in RAM 22 (rewriting the value of the total fuel injection number Cinj to "2"). Then, the CPU 20 returns back to S602 and determines the second fuel injection timing for the second cylinder. In this case, since the mixture is ignited in the above-described first cylinder, in the above-described S603, the CPU 20 judges that the value of the ignition condition judgement flag F is "1" and advances to S604 and the CPU 20 sets the fuel injection start timing Tinj at a timing earlier by the predetermined period T*Cinj than the intake stroke start timing Tstart.

Here, since the fuel injection start timing Tinj of the above-described second cylinder is Tsart–2·T, this is earlier than the fuel injection start timing Tinj=Tstart–T of the above-described first cylinder.

Then, the CPU 20 advances to S605, and increments by one the value of the total fuel injection number Cinj stored in RAM 22 (rewriting the value of the total fuel injection number of the RAM 22 Cinj to "3"). Thereafter, the CPU 20 returns back to S602 and determines the second fuel injection timing for the third cylinder. In this case, since the mixture is ignited in the above-described first cylinder, in the above-described S603, the CPU 20 judges that the value of the ignition condition judgement flag F is "1" and advances to S604 and the CPU 20 sets the fuel injection start timing Tinj at a timing earlier by the predetermined period T*Cinj than the intake stroke start timing Tstart.

Here, since the fuel injection start timing Tinj of the above-described third cylinder is Tstart−3·T, this is much earlier than the fuel injection start timing of the above-described second cylinder. Thereafter, the process after the above-described S602 is repetitively executed for each cylinder and the start timing fuel injection start timing is determined for each cylinder. Then, when the mixture is ignited in all the cylinders, the value of the start judgement flag XSTEFI of the RAM 22 is reset at "0". Accordingly, in S602, the CPU 20 judges that the start judgement flag (XTEFI) is not "1" and advances to S607.

In the above-described S607, the CPU 20 executes the fuel injection amount controlling routine and the fuel injection timing controlling routine after the start of the engine, and subsequently resets the total fuel injection number Cinj stored in the RAM 22 in S608 (rewriting the value of the total fuel injection number Cinj to "0") and further resets the ignition condition judgement flag F of the RAM 22 in S609 (rewriting the value of the ignition condition judgement flag F at "0").

Thus, the CPU 20 realizes the fuel injection start timing changing means according to the present invention by executing the start timing fuel injection timing controlling routing.

According to the above-described present embodiment, when the mixture is ignited in some cylinder in starting the internal combustion engine, the engine RPM is increased in the expansion stroke of that cylinder and the intake stroke of the third stroke is shortened in the cylinders in which the fuel injection is performed after that. However, in the case where the ignition or misfire in each cylinder is judged and the ignition in some cylinder is detected, the fuel injection start timing of each cylinder is advanced by the predetermined period whereby the fuel injection is completed for the intake stroke of each cylinder and the necessary amount of fuel may be fed into each cylinder.

Incidentally, in the present embodiment, an example has been described as to how to judge whether or not the mixture is normally ignited by the expansion stroke time of each cylinder. However, it is possible to change this so that a combustion pressure sensor is mounted on each cylinder to judge whether the mixture is normally ignited or misfired, on the basis of an output signal value of the combustion pressure sensor.

What is claimed is:

1. A start timing fuel injection controlling apparatus for an internal combustion engine, in which fuel injection is performed in synchronism with an intake stroke of each cylinder in starting the internal combustion engine provided with a plurality of cylinders, comprising:

an injection number counter means for counting a total number obtained by summing the fuel injection number in all the cylinders from a start of an operation of the internal combustion engine; and a fuel injection timing changing means for advancing by a predetermined period a fuel injection start timing when the fuel injection number counted by said injection number counter means is equal to or more than a predetermined number.

2. A start timing fuel injection controlling apparatus for an internal combustion engine as claimed in claim 1, characterized in that said fuel injection timing changing means changes the fuel injection start timing in accordance with an increase of the fuel injection number.

3. A start timing fuel injection controlling apparatus for an internal combustion engine, in which fuel injection is performed in synchronism with an intake stroke of each cylinder in starting the internal combustion engine provided with a plurality of cylinders, comprising:

an ignition condition detecting means for detecting ignition or misfire of each cylinder; and a fuel injection timing changing means for advancing a fuel injection start timing by a predetermined period in the case where the ignition is detected by said ignition condition detecting means.

4. A start timing fuel injection controlling apparatus for an internal combustion engine as claimed in claim 3, further comprising an injection number counter means for counting a total number obtained by summing the fuel injection number of all the cylinders after the ignition is detected by said ignition condition detecting means, characterized in that said fuel injection timing changing means changes the fuel injection start timing in accordance with the increased number counted by said injection number counter means.

5. A start timing fuel injection controlling apparatus for an internal combustion engine as claimed in claim 3, wherein said ignition condition detecting means judges the ignition or misfire in each cylinder in response to a time needed for the expansion stroke of each cylinder.

* * * * *